United States Patent
Holm et al.

(10) Patent No.: US 6,754,418 B1
(45) Date of Patent: Jun. 22, 2004

(54) OPTICAL ARRANGEMENT

(75) Inventors: Johan Holm, Frederiksberg (DK); Fredrik Laurell, Danderyd (SE); Magnus Olson, Järfälla (SE); Christian Vieider, Sollentuna (SE); Henrik Åhlfeldt, Kista (SE)

(73) Assignee: Cobolt AB, Stockholm (SE)

( * ) Notice: Subject to any disclaimer, the term of this patent is extended or adjusted under 35 U.S.C. 154(b) by 0 days.

(21) Appl. No.: 09/958,950

(22) PCT Filed: Apr. 14, 2000

(86) PCT No.: PCT/SE00/00718
§ 371 (c)(1),
(2), (4) Date: Jan. 28, 2002

(87) PCT Pub. No.: WO00/65697
PCT Pub. Date: Nov. 2, 2000

(30) Foreign Application Priority Data

Apr. 23, 1999 (SE) .............................. 9901470

(51) Int. Cl.[7] .............. G02B 6/43; H01S 3/042; H01S 5/00
(52) U.S. Cl. .............. 385/49; 385/88; 372/44; 372/50; 372/34
(58) Field of Search .............. 372/34, 35, 50, 372/69–71; 385/39, 49, 88–92

(56) References Cited

U.S. PATENT DOCUMENTS

| 4,768,199 | A | | 8/1988 | Heinen et al. |
| 5,181,214 | A | | 1/1993 | Berger et al. |
| 5,243,617 | A | * | 9/1993 | Pocholle et al. .............. 372/69 |
| 5,828,683 | A | * | 10/1998 | Freitas ........................ 372/36 |
| 6,229,831 | B1 | * | 5/2001 | Nightingale et al. .......... 372/36 |
| 6,373,865 | B1 | * | 4/2002 | Nettleton et al. ............. 372/10 |

FOREIGN PATENT DOCUMENTS

| DE | 196 43 531 A1 | | 5/1998 | |
| WO | WO 97/14200 A1 | | 4/1997 | |
| WO | WO-9714200 A1 | * | 4/1997 | ......... H01S/3/0941 |
| WO | WO 98/26885 A1 | | 6/1998 | |

* cited by examiner

Primary Examiner—Hemang Sanghavi
Assistant Examiner—Omar Rojas
(74) Attorney, Agent, or Firm—Burns, Doane, Swecker & Mathis, L.L.P.

(57) ABSTRACT

A solid-state laser or arrangement for wavelength conversion is disclosed, which in its simplest embodiment is comprised of a light-generating body arranged in a supporting means, the light-generating body having a shape which is substantially complementary to a guiding structure which is formed in the supporting means. The guiding structure is formed with a high degree of accuracy, for instance, by etching the supporting means or by replicating an original. Between the light-generating body and the guiding structure of the supporting means a thin contact layer is arranged, the purpose of which is to increase the adherence to and/or the heat transfer to the supporting means. Due to the fact that the contact layer is a deformable material, possible discrepancies as regards complementary between the guiding structure and the light-generating body will be filled by the contact layer whereby a close fit is obtained between the complementary structure.

20 Claims, 3 Drawing Sheets

US 6,754,418 B1

OPTICAL ARRANGEMENT

TECHNICAL FIELD

The present invention relates to a light-generating arrangement which comprises at least one supporting means in which a light-generating solid body is arranged, and to a method for arranging optical components in a supporting means.

PRIOR ART

An arrangement for generating coherent light in the form of a solid-state laser consists in its simplest embodiment of a light-generating, solid body of a host material (e.g. glass or crystal) doped with active ions (e.g. rare earth metals or transition metals) and a set of mirrors which define an oscillator cavity round the light-generating body. The light-generating body is usually supplied with the requisite energy optically, so-called optical pumping. Such pumping is usually effected by means of a flash lamp or a laser diode arrangement.

Another arrangement for generating coherent light is a so-called optical parametric oscillator (OPO). In an OPO the light-generating body comprises a non-linear crystal. An OPO does not generate light in the same way as a laser, but functions as a converter from one light wavelength to another. The pumping of an OPO is carried out by pumping coherent light, which has been generated in some other way, into the OPO, whereby coherent light is generated at other wavelengths. Other arrangements for wavelength conversion function in a similar way. Examples of different types of wavelength conversion are frequency doubling, sum frequency generation, difference frequency generation and parametric frequency generation.

A holding device for a solid laser body is previously known from, for instance, DE-196 43 531 A 1. This holder uses a foil between the laser body and the holder for increasing the heat transfer from the laser body to the holder. Recesses are made in the holder for receiving superfluous foil material, for instance, in connection with expansion of the laser body. Thus, the aim is to reduce internal stress in the laser body.

U.S. Pat. No. 5,265,113 discloses an integrated microsystem for electronic and optical components which are mounted in anisotropically etched structures in a base plate of semiconductor material. The components are electrically controllable and movable in such a manner that their positions relative to the base plate are actively adjustable.

The above-mentioned arrangements for generating coherent light have, however, limitations as regards the light power which can be extracted from a light source of a certain volume. In connection with optical pumping of coherent light sources, the efficiency is lower than 100%. This means that some of the energy which is deposited in the light-generating body of the arrangement is lost in the form of heat. Since arrangements for generating coherent light, which are based on solid, light-generating bodies, such as solid-state lasers and arrangements for frequency conversion, are driven towards higher and higher output power, problems often arise as regards the heat transfer from the light-generating body because of the low heat conductivity of the dielectric materials of which the light-generating body typically is comprised. The heating which thus arises results in thermal expansion of the heated area and other thermal effects, such as thermal lensing, thermal birefringence and reduced gain (caused by, inter alia, a decrease of the lifetime of the excited state in the active ions of the laser material and/or an increased thermal population of the energy levels of the active ions).

Furthermore, there is a risk that, for instance, the laser material of a solid-state laser cracks as a result of thermally induced internal stress. This is a particularly great problem as regards laser material with an anisotropic atomic structure.

For the non-linear crystal in an OPO or some other frequency-converting arrangement, the main problems consist of thermal lensing and poor phase matching caused by the heating.

The miniaturisation of coherent light sources of the type mentioned above involves a reduction of the volume which is occupied by the light beams in the light-generating body. In order not to increase the thermal loading, the power of the light source has to be decreased. This is a considerable limitation of prior-art technique since both a miniaturisation of the light source and an increase of the output power usually are desired in one and the same light source.

The problems mentioned above have limited the output power from miniaturised, coherent light sources to be typically a few hundred milliwatt.

DESCRIPTION OF THE INVENTION

An object of the present invention is to provide a construction for optically pumpable light sources by means of which the handling of the thermal loading on the light-generating body as well as the alignment of components included in the light source are simplified to a considerable extent.

Another object of the invention is to provide a manufacturing method which allows mass manufacturing of optically pumpable light sources according to the present invention and which allows simple incorporation of further components in the arrangement. Examples of further components which advantageously are incorporated in the arrangement are so-called functional elements. A functional element should, as regards the present application, comprise non-linear crystals for frequency conversion, active or passive Q-switches for producing light pulses with high peak power, as well as active or passive mode locking means to produce ultrashort light pulses. The term "functional element" also comprises means for external intensity modulation or phase modulation and means for controlling the direction of the emitted light beam.

According to the invention, a solid-state laser or an arrangement for wavelength conversion is thus provided which in its simplest embodiment is characterised by an optically pumpable, light-generating body of a dielectric material, the body being arranged in a supporting means and having a shape which is substantially complementary to a guiding structure formed in the supporting means. The guiding structure is formed with a high degree of accuracy, for instance, by etching the supporting means or by replicating an original. Between the light-generating body and the guiding structure of the supporting means, a thin contact layer is arranged, the purpose of which is to improve the adherence to and/or the heat transfer to the supporting means. Due to the fact that the contact layer consists of a deformable material, any discrepancies as regards complementarity between the guiding structure and the light-generating body will be filled by the contact layer, whereby a close fit is obtained between said complementary structures. Preferably, the contact layer has a thickness less than 100 micrometer. A thickness of some tens of micrometers is especially preferred.

Examples of optically pumpable, light-generating solid bodies of dielectric material which might constitute the light-generating body of the invention, are optically non-linear crystals for frequency conversion and laser material based on crystal or glass.

According to another aspect of the invention, a method for manufacturing the above-mentioned light sources is provided. Briefly, the method is characterised in that a plate of a crystalline material (a supporting means) is provided with one or more guiding structures which have a shape that is substantially complementary to the light-generating body. Alternatively, a supporting means is provided with guiding structures by replicating an original. In the guiding structure a contact layer of the type mentioned above is arranged, preferably by vapour deposition, electroplating or sputtering of a jointing metal, after which the light-generating body is arranged in the guiding structure of the supporting means. According to a preferred embodiment, the supporting means comprises at least two parts which jointly enclose the major part of the area of the side faces of the light-generating body, while two opposite end faces of said body are let free for the passing of light. The supporting means is conveniently mounted in thermal contact with a thermoelement with the aim of allowing control of the temperature of the light-generating body. The supporting means may also be provided with microchannels for further increase of the possibility of thermal control.

One advantage of the present invention is that the light-generating body fills the entire guiding structure. This embodiment gives together with said contact layer an excellent heat transfer from the light-generating body to the supporting means.

Another advantage of the invention is that, thanks to the supporting means being micromechanically provided with well-defined guiding structures, the device can with a high degree of accuracy be miniaturised to millimetre dimensions. The limitation of the heat transfer from the light-generating body is usually the limited thermal conductivity of the light-generating body. A reduction of its cross-sectional area thus results in a substantial reduction of the thermal loading on the arrangement. The lower limit of the cross-section is determined by the cross-section of the light beam which propagates through the arrangement.

The term "miniaturised light source" relates mainly to bulk lasers and arrangements for frequency conversion, whose optically pumpable light-generating body has a cross-sectional area, perpendicular to the propagation direction of the light, which is in the range of less than 1 mm$^2$ to a few mm$^2$, but the invention also relates to other light-generating bodies, for instance, waveguiding structures.

BRIEF DESCRIPTION OF THE DRAWINGS

The objects and features of the invention will be more evident when reading the following detailed description of a number of preferred embodiments in connection with the accompanying drawings, in which.

PREFERRED EMBODIMENTS

Figure 1A:
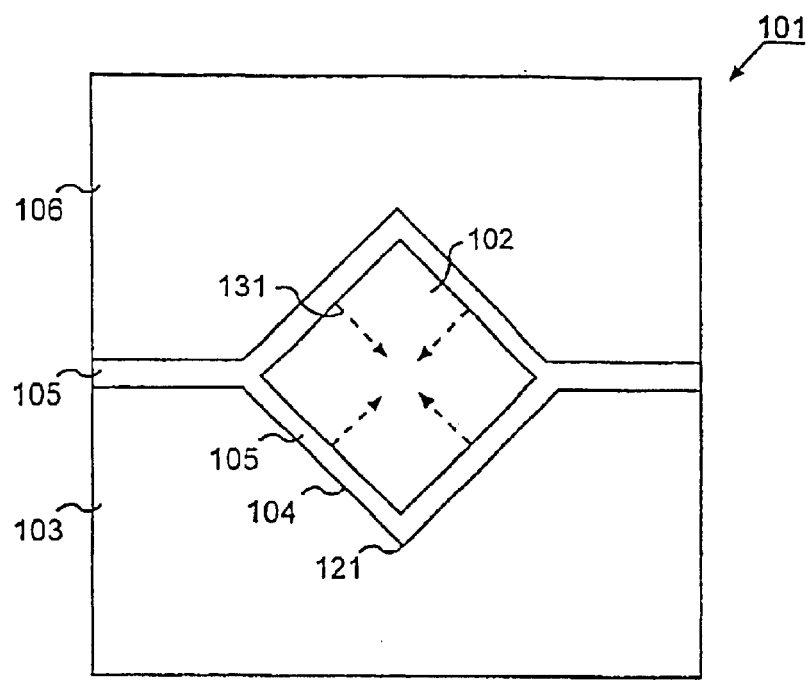
FIG. 1a is a cross-sectional view of a preferred embodiment of an arrangement according to the invention.
Figure 1B:
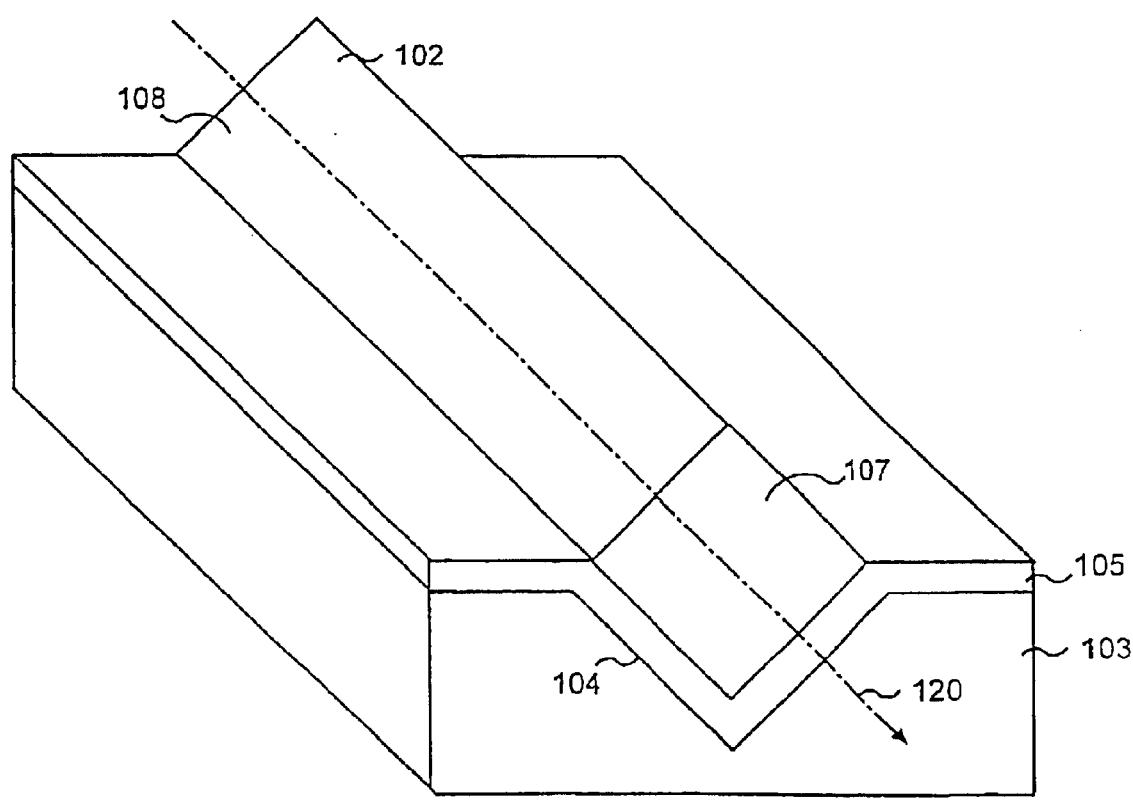
FIG. 1b is a schematic perspective view of the embodiment shown in FIG. 1a, one of the parts of the supporting means being removed.

FIG. 1a is a cross-sectional view, transversely to the intended propagation direction of the light, of a preferred embodiment of the present invention. FIG. 1b is a perspective view of the embodiment shown in FIG. 1a, one of the enclosing parts of the arrangement being removed.

According to this embodiment, the optically pumpable, light-generating arrangement 101 is a laser arrangement which comprises a supporting means 103, 106 provided with a guiding structure 104. The supporting means 103, 106 comprises a first silicon plate 103 (the supporting surface of which is constituted by the <100> plane of the silicon crystal) which, by an anisotropic etching method well-known to those skilled in the art, is provided with the guiding structured 104. This guiding structure 104 consists of a v-grove, the side faces of which are constituted by the <111> plane of the silicon crystal, the bottom angle 121 being 70.5 degrees.

In the guiding structure 104, a contact layer 105 is arranged which consists of a relatively soft jointing metal. By the expression "soft metal" is here meant a plastically deformable metal which has a hardness (Brinell) below 1000 MPa (preferably below 100 MPa), or alternatively is softer than a laser material 102 which is arranged in the guiding structure 104. Especially preferred jointing metals are indium and tin (hardness 9 and 51 MPa, respectively), or suitable solderable alloys thereof (e.g. InSn, InAg, PbSn, AgSn). As an alternative to a jointing metal a heat conducting adhesive may be used.

The laser material 102 (i.e. the optically pumpable, light-generating solid body of dielectric material) is precision-sawn in such a manner that its side faces 108 are substantially complementary to the guiding structure 104 in which the laser material 102 is arranged. The end faces 107 of the laser material are conveniently provided with dielectric mirrors (e.g. multiple-layer coatings, not shown in the figure) which define a laser cavity. The supporting means 103, 106 also comprises a second silicon plate 106 which is identical to the first plate 103 and serves as a "lid" over the laser material 102.

The arrangement thus comprises a laser material 102 which is arranged between two silicon plates 103, 106 with etched guiding grooves 104, the laser material 102 being in contact with the guiding grooves 104 via a contact layer 105 consisting of a soft metal, the contact layer 105 thus being arranged between the laser material 102 and the guiding groove 104. According to this embodiment, the laser material 102 is rhomboid in cross-section. When the two silicon plates 103, 106 provided with guiding grooves are pressed together round the laser material 102, an excellent fit to the guiding groove 104 is obtained thanks to the shape of the laser material, which is complementary to the guiding groove 104 and the soft jointing metal. The rhomboid shape of the laser material 102 also contributes to the force components 131 which act on the laser crystal 102 being symmetrically oriented, which further increases the stability and the fit to the supporting means 103, 106 and, thus, the thermal contact between the laser material 102 and the supporting means 103, 106. A light propagation path 120 has been indicated.

The contact layer 105 has a thickness of some tens of micrometers and the jointing metal preferably has good thermal conductivity with a view to increasing the heat transfer between the laser material 102 and the supporting means 103, 106. Examples of suitable laser materials are dielectric crystals, such as yttrium-aluminium-garnet (YAG), yttrium-lithium-fluoride (YLF), yttrium vanadate (YVO), yttrium-ortho aluminate (YALO), doped with, for instance, rare earth metals or transition metals, but also other solid-state materials may be suitable, such as doped glass.

According to an alternative embodiment, the laser material is triangular in cross-section, the "lid" of the supporting means being substantially flat.

Figure 2:
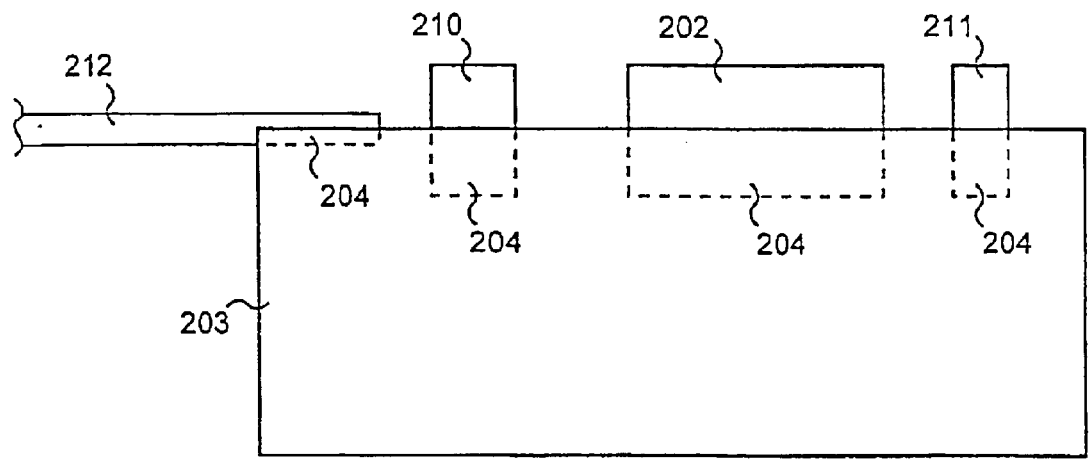
FIG. 2 is a schematic side view of an embodiment, where several elements are arranged in the supporting means.
Figure 3:
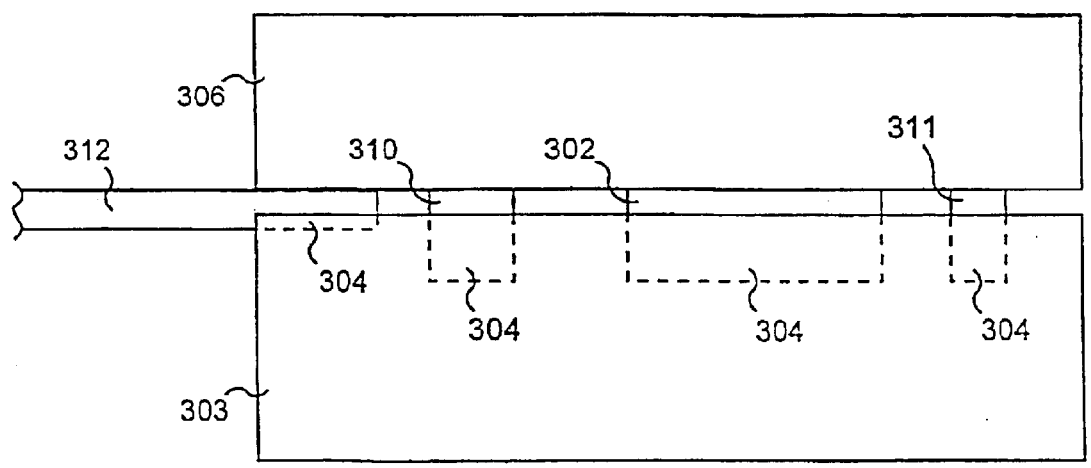
FIG. 3 is a schematic side view of an embodiment where the supporting means is comprised of two parts which peripherally enclose the elements arranged in the supporting means.
Figure 4:
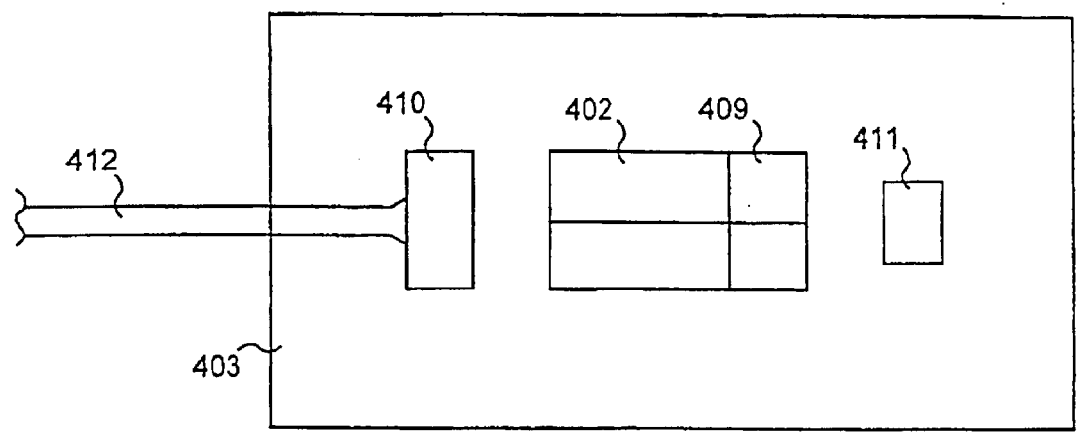
FIG. 4 is a schematic top plan view of yet another embodiment of the invention.

As shown in FIGS. 2–4, further alternative embodiments may be obtained by forming guiding structures 204, 304 in the supporting means 203, 303, 306, 403 and arranging one or more functional elements and/or lens means therein in connection with the laser cavity. The functional elements can be placed inside the cavity as well as outside (after) the same. The term "functional element" here comprises components which in some way affect the properties of the emitted light, such as non-linear crystals for frequency conversion, active or passive Q-switches to produce light pulses with high peak power and active or passive mode locking means to produce ultrashort light pulses. Also elements for external intensity modulation or phase modulation and/or control of the direction of the laser beam are comprised.

FIGS. 2–4 schematically show optically pumped arrangements according to the present invention. In the shown cases optical pumping is effected by means of an optical fiber 212, 312, 412. The light emitted from the fiber is focused into the laser material 202, 302, 402 through suitable lens means 210, 310, 410, for instance, conventional lenses, graded-index lenses (GRIN lenses) or non-imaging lens ducts.

Figure 5:
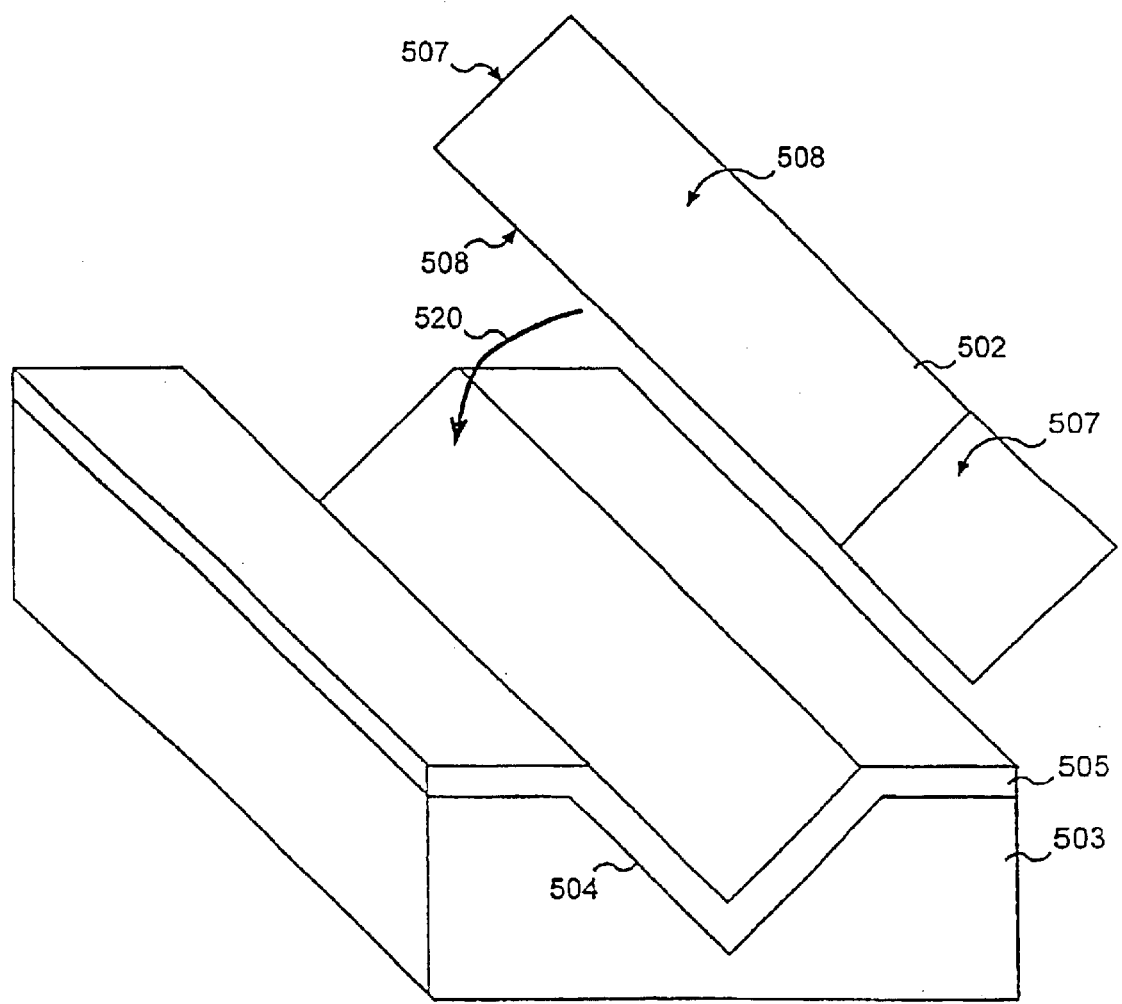
FIG. 5 is a schematic illustration of a method according to the invention.

FIG. 5 shows an example of a method for arranging an optical component 502 in a supporting means 503. The method comprises providing a plate of an etchable material, preferably silicon, with a guiding groove (guiding structure) 504, in which the optical component 502 can be arranged. This guiding structure 504 is conveniently produced by anisotropic wet etching with potassium hydroxide, ethylene diamine-pyrocatechol or tetramethyl-ammonium hydroxide after masking the supporting means 503 photolithographically to define the guiding groove 504.

A jointing metal as described above is then deposited over the supporting means 503 by, for instance, vapour deposition, sputtering or electroplating. The depositing may take place through a mask, either a shadow mask or a photo-resist mask, if depositing is desired only over certain parts of the supporting means 503.

An optical component (an optically pumpable, light-generating material) is precision-sawn in order to obtain a body 502, the side faces 508 of which are substantially complementary to the guiding structure 504. The light-generating body 502 is then arranged in the guiding structure 504, an excellent fit with the supporting means 503 being obtained thanks to the well-defined guiding groove 504. The adhesion to the contact layer 505 can be improved by coating the precision-sawn side faces 508 of the body with a metal layer which also serves as a reflecting layer for light that propagates inside the light-generating body 502.

Preferably, but not necessarily, the light-generating body 502 is given a rhomboid shape and the guiding structure 504 is given a v-shape. A lid (106 in FIG. 1a) is preferably arranged over the arrangement in order to obtain an enclosing supporting means (103, 106 in FIG. 1a) which peripherally encloses the light-generating body (102 in FIG. 1a). A peripherally enclosing supporting means gives, when in operation, the arrangement a considerably more symmetric temperature profile. Also the rhomboid shape contributes to a more symmetric temperature profile, which has been shown by simulations using finite element methods.

Any optical coatings on the end faces 507 of the light-generating body are conveniently deposited on an original plate before it is precision-sawn to the selected shape. When sawing, the plate is protected from sawdust by a protective film.

According to an alternative method, deep dry etching is used instead of the above-mentioned wet etching. By this method grooves with an arbitrary geometry can be formed.

According to another method, guiding structures are produced by replicating an original, which has been formed in the above-mentioned manner (possibly with an inverted geometric shape). The original preferably consists of silicon since the possibility of microstructuring is considerable as regards silicon. The replication is, for example, made by electroplating of thick (>100 micrometer) metal layers on the silicon surface. The obtained metal plate is then separated from the silicon plate and, thus, constitutes a perfect negative image of the original. If the original is not geometrically inverted relative to the intended shape of the supporting means, the obtained metal plate will, in its turn, be replicated to provide the correct geometric shape of the supporting means.

In all the described embodiments, the supporting means can advantageously be provided with microchannels for transporting cooling fluid, thereby obtaining an increased possibility of controlling the temperature of the arrangement. The supporting means is conveniently arranged in thermal contact with a thermoelement (for example a Peltier element) for a further possibility of temperature control. The use of microchannels with cooling fluid may then be avoided.

In other embodiments of the invention, a plurality of light-generating bodies are placed side by side to provide a light source with an array of light sources. In such an embodiment of the invention the output power from the arrangement can easily be escalated to high power levels. Moreover, the cross-sectional profile of the emitted beam can be controlled by individual control of the sources included in the array.

Although the invention has been described by means of embodiments where the light-generating body is a laser material, the invention also relates to other light-generating materials, such as non-linear crystals. A common feature of the materials in question is that they are optically pumpable, dielectric. Furthermore, there are no limitations as regards the use of silicon in the supporting means, nor any limitations as regards guiding structures that are formed as v-grooves. On the contrary, in several applications it will be advantageous to select other materials for the supporting means and/or other geometries for the guiding grooves. In the described embodiments, the optical pumping is carried out by means of an optical fiber. Alternative pump sources which may be possible in various embodiments comprise laser diodes and laser diode arrays.

What is claimed is:

1. An arrangement for generating light, comprising an optically pumpable, light-generating solid body of a dielectric material having a contact surface contacting a supporting means, wherein the contact surface of the light-generating body contacting the supporting means is substantially complementary to a guiding structure which is formed in the supporting means, a contact layer is arranged substantially between the contact surface and the guiding structure, the contact layer being comprised of a deformable material, the supporting means comprises, at least partly, an etchable, crystalline material, and the supporting means comprises, at least partly, an etchable, crystalline material of silicon, and wherein the guiding structures are constituted by, along the <111> plane of the silicon crystal, etched v-grooves with a bottom angle of 70.5 degrees, the contact surface of the light-generating body contacting the supporting means having a triangular or rhomboid shape.

2. An arrangement as claimed in claim 1, wherein the contact layer is softer than the light-generating body and has a thickness less than 100 micrometer.

3. An arrangement as claimed in claim 2, wherein the thickness of the contact layer is less than 30 micrometer.

4. An arrangement as claimed in claim 1, wherein the contact layer comprises indium.

5. An arrangement as claimed in claim 1, wherein the contact layer comprises a thermally conductive adhesive.

6. An arrangement as claimed in claim 1, wherein the contact layer comprises a solderable alloy.

7. An arrangement as claimed in claim 1, wherein the light-generating body is an optically pumpable laser material.

8. An arrangement as claimed in claim 1, wherein the supporting means comprises at least two parts which together peripherally enclose the light-generating body, while at least one propagation path through the light-generating body is open for propagation of light through the arrangement, the light-generating body substantially filling the entire guiding structure which is formed in the supporting means.

9. An arrangement as claimed in claim 7, wherein the optically pumpable laser material is arranged to be supplied with energy via an optical fiber.

10. An arrangement as claimed in claim 1, wherein a functional element is arranged in connection with the light-generating body.

11. An arrangement as claimed in claim 1, wherein the light-generating body is a non-linear crystal.

12. An arrangement as claimed in claim 11, wherein the supporting means comprises at least two parts which together peripherally enclose the non-linear crystal, while at least one propagation path through the nonlinear crystal is open for propagation of light through the arrangement.

13. An arrangement as claimed in claim 1, wherein the supporting means is provided with microchannels for transporting cooling fluid through the supporting means.

14. An arrangement as claimed in claim 1, the arrangement also comprising a thermoelement with which the supporting means is in thermal contact.

15. An arrangement as claimed in claim 1, wherein a plurality of optically pumpable, light-generating bodies are arranged side by side to provide an arrangement for generating light by an array of light sources.

16. A method for arranging an optically pumpable, light-generating solid body of a dielectric material in a supporting means of light-generating arrangements, the method comprising the steps of:

providing at least one guiding structure by etching in an original that is at least partly crystalline, providing at least one guiding structure in the supporting means by replicating the original, the guiding structure being given a shape which is substantially complementary to a surface of the optical component, the surface being intended for contact with the guiding structure, the guiding structure being given a shape which is substantially complementary to a surface of the optical component, the surface being intended for contact with the guiding structure, applying a contact layer over substantially the entire contact surface between the guiding structure and the optical component, the contact layer being comprised of a deformable material that is softer than the optical component, and having a thickness less than 100 micrometer, and arranging the optical component in the guiding structure of the supporting means so that substantially the entire surface, complementary to the guiding structure, of the optical component is in contact with the guiding structure via the contact layer.

17. A method as claimed in claim 16, further comprising the step of coating the surface, complementary to the guiding structure, of the optically pumpable solid body with a reflecting layer.

18. A method as claimed in claim 16, wherein the contact layer between the optically pumpable solid body and the guiding structure is applied by vapour deposition of a plastically deformable, thermally conductive material.

19. A method as claimed in claim 16, further comprising the step of providing the supporting means with microchannels for transporting a cooling fluid.

20. A method of using an arrangement as claimed in claim 1, wherein an optical component of glass or dielectric crystal is arranged in a guiding structure of a supporting means, and a deformable contact layer is provided between the optical component and the guiding structure of the supporting means.

* * * * *